US009680834B2

(12) United States Patent
Sanso et al.

(10) Patent No.: US 9,680,834 B2
(45) Date of Patent: Jun. 13, 2017

(54) WEB DOCUMENT PREVIEW PRIVACY AND SECURITY PROTECTION

(71) Applicant: Adobe Systems Incorporated, San Jose, CA (US)

(72) Inventors: Antonio Sanso, Allschwil (CH); Damien Antipa, Saint-Louis (FR)

(73) Assignee: Adobe Systems Incorporated, San Jose, CA (US)

( * ) Notice: Subject to any disclaimer, the term of this patent is extended or adjusted under 35 U.S.C. 154(b) by 26 days.

(21) Appl. No.: 14/793,843

(22) Filed: Jul. 8, 2015

(65) Prior Publication Data

US 2017/0012980 A1  Jan. 12, 2017

(51) Int. Cl.
*H04L 29/06* (2006.01)
*H04L 29/08* (2006.01)

(52) U.S. Cl.
CPC .......... *H04L 63/10* (2013.01); *H04L 63/0236* (2013.01); *H04L 67/02* (2013.01)

(58) Field of Classification Search
CPC ...... H04L 63/10; H04L 63/0236; H04L 67/02
See application file for complete search history.

(56) References Cited

U.S. PATENT DOCUMENTS

| 2003/0208472 | A1* | 11/2003 | Pham | G06F 17/30876 |
| 2007/0233898 | A1* | 10/2007 | Raviv | G06F 17/30899 |
| | | | | 709/238 |
| 2008/0222736 | A1* | 9/2008 | Boodaei | G06F 21/128 |
| | | | | 726/27 |
| 2011/0314389 | A1* | 12/2011 | Meredith | G06F 8/60 |
| | | | | 715/751 |
| 2012/0102317 | A1* | 4/2012 | Mathur | G06F 21/10 |
| | | | | 713/156 |
| 2013/0019152 | A1* | 1/2013 | Rau | G06Q 30/0242 |
| | | | | 715/208 |
| 2015/0113606 | A1* | 4/2015 | Dabbiere | H04L 63/0281 |
| | | | | 726/4 |

OTHER PUBLICATIONS

Wu, Privacy Preservation for Detecting Malicious Web Sites from Suspicious URLs, Aug. 2011, Business Computing and Global Informatization 2011.*

(Continued)

*Primary Examiner* — James Turchen
*Assistant Examiner* — Harvey Cohen
(74) *Attorney, Agent, or Firm* — Finch & Maloney PLLC

(57) ABSTRACT

Techniques are disclosed for protecting the privacy and security of data associated with a web document. A web browser is configured to manipulate the URL, which contains an access token, of a preview web page document before the browser loads external resources (e.g., web page content) linked from the preview web page document. For example, the browser may change a current page URL containing the access token to another sacrificial URL that does not include the token. In addition, the browser will send the sacrificial URL, rather than the original URL, as a referrer to the various resources that provide the web page content, which prevents exposure of the access token to those resources while the web page content is loading. After the web page content is loaded into the browser, the current page URL of the browser is changed back to the original URL.

16 Claims, 5 Drawing Sheets

(56) References Cited

OTHER PUBLICATIONS

Alberdeston et al., Click-tracking blocker Privacy preservation by disabling search engines click-tracking, Feb. 12, 2015, Global Communications Conf 2014 IEEE.*

Yu, Recovering and Protecting against DNS Cache Poisoning Attacks, Dec. 29, 2011, IEEE Explore.*

Jakobsson et al., Web Camouflage: Protecting Your Clients from Browser-Sniffing Attacks, Dec. 12, 2007, IEEE Proceedings.*

Ma et al., Learning to detect malicious URLs, ACM Transactions on Intelligent Systems and Technology vol. 2 issue 3 Apr. 2011.*

Nikiforakis et al, Stranger danger: exploring the ecosystem of ad-based URL shortening services, Apr. 2014, Proceedings of the 23rd international conference on World wide web, pp. 51-62.*

Chang et al., Analyzing and defending against web-based malware, ACM Computing Surveys vol. 45 Issue 4 Aug. 2013 Article 49 ACM.*

* cited by examiner

WEB DOCUMENT PREVIEW PRIVACY AND SECURITY PROTECTION

FIELD OF THE DISCLOSURE

This disclosure relates generally to the field of data processing, and more particularly, to techniques for protecting the privacy and security of data associated with a web document.

BACKGROUND

A web document is an electronic document that is suitable for use with a web browser. Web documents are identified by Uniform Resource Identifiers (UIRs). A URI is a compact sequence of characters that identify an abstract or physical resource, such as an electronic document or web page. A uniform resource locator (URL) is type of URI that specifies the location of the resource on a computer network, and a mechanism for retrieving the resource, such as Hypertext Transfer Protocol (HTTP). An HTTP referrer (also spelled "referer") is an HTTP header field provided by the resource that identifies the URI that linked to the resource being requested. HTTP header fields are components of the header section of request and response messages. An example of an HTTP referrer field is "Referer: http://www.example.com/home." By checking the referrer, the new web page can see where the request originated. Although some browsers do not send the referrer from a secure (HTTPS) page, the referrer is generally provided from non-secure (HTTP) pages. Therefore, in the latter cases, the URL is not considered secure.

DETAILED DESCRIPTION

Figure 1:
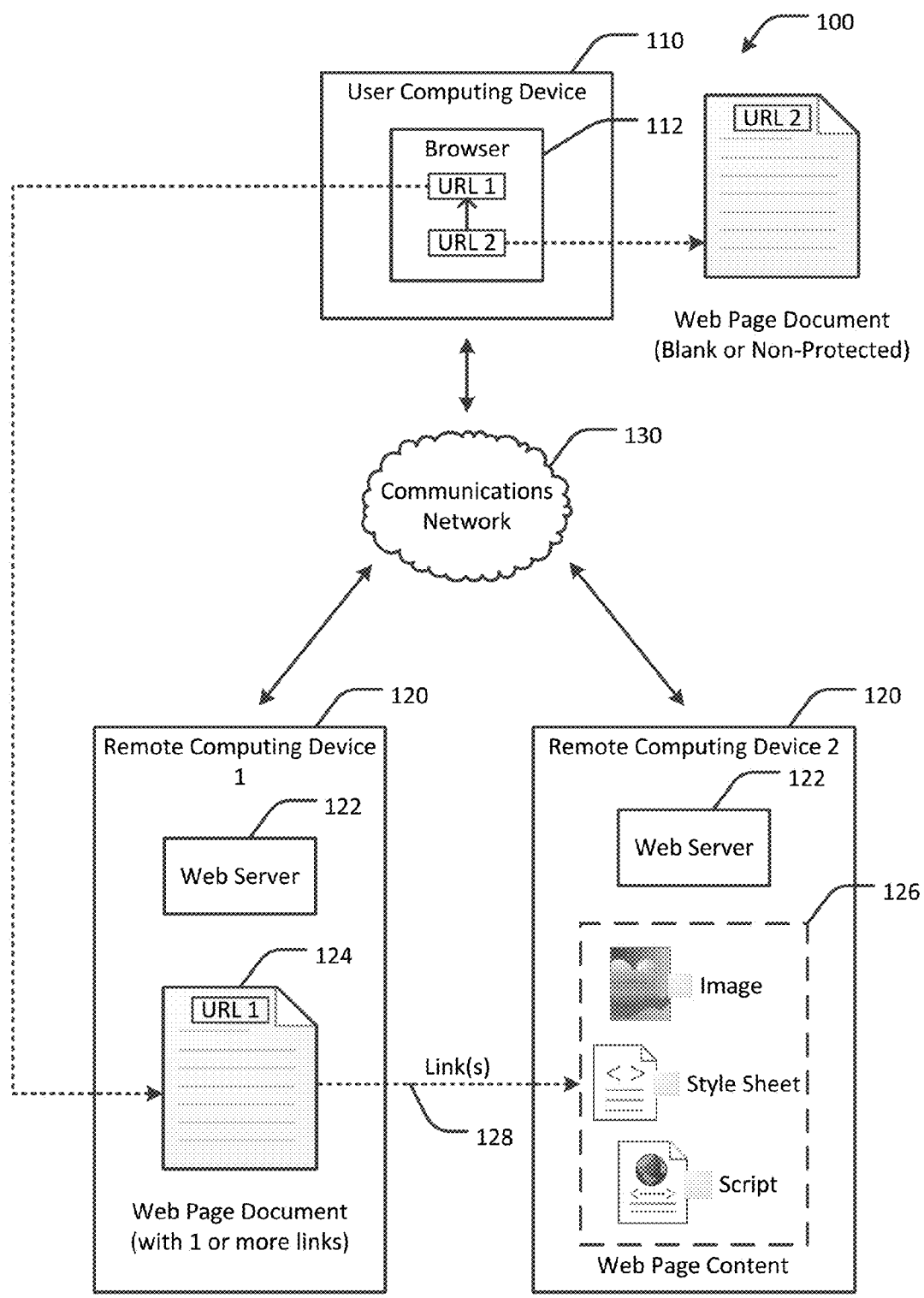
FIG. 1 illustrates an example system configured for protecting the privacy and security of data associated with a web document, in accordance with an embodiment of the present disclosure.

The present disclosure provides techniques for protecting the privacy and security of data associated with a web document by way of URL manipulation. An example scenario where such techniques may be utilized is in the context of a Content Management System (CMS), although numerous other contexts and scenarios will be apparent in light of this disclosure, particularly those where data privacy and URL security is an issue. To further explain the attendant privacy and security issues by way of one such example scenario, a CMS is a computer program that allows users to, among other things, edit and maintain the resources via a graphical user interface (GUI). Some CMS applications execute in the context of a client-server architecture that leverages a repository as a content storage platform, wherein the CMS executes on the server and interacts with a browser executed by the client. Such CMS applications can provide GUI-based authoring and editing tools that are operable using the existing functionality of the browser, for example, in the form of a Hypertext Markup Language (HTML) document or other structured document (e.g., a web page) that is rendered by the browser. When authoring or editing a web page with a CMS, there are times when the author or editor may wish to show the work in progress to another user for demonstration, review or comment. Some such authoring tools can provide a so-called preview of a web page to users who are not authors or editors of the web page in the CMS and do not otherwise have credentials to access the CMS or its content. Providing access to non-credentialed users is typically accomplished using a token that is part of the URI. For instance, the editor provides the URI to the other person and the other person is then able to access the page preview using that URI. The token is usually a long string that has enough entropy so as to inhibit guessing by an attacker.

Unfortunately, using a token in the URI introduces the risk of leaking the token either in the log files or in the referrer (this has both security and privacy implications). The leakage can happen basically in three different situations: (1) through a link click in the preview page (e.g., 'click me' link); (2) through the image tag; or (3) through the script tag, the <link> tag and other similar tags which reference external resources. The token leakage problem for cases 1 and 2 can be respectively solved by: (1) building a clickTrap either with a new div element or with a css override; and (2) proxying the image though an intermediate URI under the control of the server to clear referrer information in the browser that may contain security token information. For case 3, however, there is no known solution.

To this end, one technique for providing a web page preview, in accordance with an embodiment of the present disclosure, includes adding an access token to the URL of the web page under development, and then providing that URL, with the access token, to another user. However, an internal browser mechanism that allows for manipulating the URL under the same domain constraint is used to hide the actual URL while the external resources are loading. This in turn causes the browser to send a different referrer to the resources without exposing the security token information. Thus, rather than showing the actual URL in the address bar, that actual URL is changed on the client to some sacrificial or otherwise arbitrary URL (e.g., adobe.com/hidden.html). To protect the security token information which can be stored as a query parameter, one embodiment of the present disclosure encodes or otherwise programs the target or so-called result website to include a JavaScript snippet on the very top of the header section of the HTML document including the content to be previewed or otherwise shared. This JavaScript snippet is configured to hide the token from any request referrer. Other scripting languages can be used as well, as will be appreciated, such that any web page served to a client may be encoded with the URL-manipulating script that, when executed by the browser accessing the web page, causes the URL manipulation to preserve privacy and security of the content, despite also providing the limited non-credentialed access. The other user navigates his or her browser to the web page referenced by the URL with the access token. If the CMS recognizes the access token as valid, the web page document will be served to the browser.

An example URL having an access token is:

```
http://aeminstance/content/geometrixx.html?
token=EXfjy0oBAAA.nMZuvRPteYhT39egdKNkpA.-
NAs__3cy2c9aeH__jAhm4Iw&postId=4979612100890612168.
```

The access token is a security measure that enables one entity to grant access to secure data owned by another entity. The access token may, for example, include a long string of characters that is sufficiently difficult for an unauthorized user to guess. As previously explained, however, there are privacy and security implications with encoding an access token in a URL access token. For example, there is a risk that the access token may be stored in an unsecure log file, or passed along within an HTTP request (for instance, in the referrer field) to another entity, which potentially exposes the access token to unauthorized users. As further previously explained, this so-called leakage of the access token can happen in a number of different situations, such as through a link encoded in the preview web page, through an image tag encoded in the preview web page, or through a script tag encoded in the preview web page.

To this end, and in accordance with an embodiment of the disclosure, the security of an access token encoded in a URL is protected from leaking by including a JavaScript code snippet on the very top of the head section of the preview web page document (e.g., within the HTML markup). This JavaScript snippet causes the web browser to perform the following routine to hide the access token from any resource receiving a request message having a referrer. Initially, the current page URL path, which is the actual or original URL of the preview web page document including the access token, is stored by the web browser in an internal variable. Next, the current page URL of the web browser is changed to a an arbitrary or otherwise sacrificial URL using, for example, the history.pushState( ) or history.replaceState( ) JavaScript functions. The sacrificial URL can be any URL that does not include the access token, for example, example.com/blank_page.html. Next, the web browser continues processing the HTML markup in the preview web page document, including loading web page content linked from the markup. After the web page content is loaded into the browser, the current page URL of the web browser is changed back to the original URL again using, for example, the history.pushState( ) or history.replaceState( ) functions. Numerous configurations and variations will be apparent in light of this disclosure.

As used herein, the term "web page," in addition to its plain and ordinary meaning, includes a structured document written in HTML, XML (Extensible Markup Language) and/or another markup language that is delivered to and rendered by a web browser. Web pages can have, among other things, text, embedded scripts (e.g., JavaScripts), formatting information and links to other resources such as images, multimedia, and/or other web pages to be displayed by the web browser. Additionally, certain layout, typographic and color scheme information can be provided by Cascading Style Sheet (CSS) instructions, which can either be embedded in the web page or in a separately referenced file.

As used herein, the term "resource," in addition to its plain and ordinary meaning, includes, but is not limited to, anything or any entity that can be identified, named, addressed or handled in any networked information system, such as the World Wide Web. A protected resource is one that is controlled within a secure environment and to which access is restricted to entities (e.g., clients, servers, applications, scripts, components, etc.) authorized by the owner of the resource. Some specific examples of protected resources include data, electronic documents, files, web pages, images, objects, services, and collections of resources and/or generally anything that has an identity and can be referenced in some manner. Some protected resources that are secured under an OAuth framework, such as described below, can be accessed by the third party application using Hypertext Transfer Protocol (HTTP) messages, specifically including the HTTP/1.1 standard protocol (currently defined by the Internet Engineering Task Force (IETF) Request for Comments (RFC) 2616), although it will be apparent in light of this disclosure that other application and authentication protocols can be used to access protected resources using the techniques disclosed herein.

OAuth is a standard protocol that enables a third party client to access protected resources by obtaining an access token, rather than using the resource owner's credentials directly. Such an access token is defined, for example, in "The OAuth 2.0 Authorization Framework" of RFC 6749 as "a string representing an access authorization issued to the client." In general, before a client can access a protected resource, it must first obtain an authorization grant from the resource owner and then exchange the authorization grant for an access token. The access token provides an abstraction, replacing different authorization constructs (e.g., username and password, assertion) for a single token understood by the resource server. This abstraction allows access tokens to be issued, for example, to a third party without compromising the integrity of other authorization credentials. The access token also eliminates the need for the resource server to accommodate multiple different authentication schemes. The access token can represent, in one specific example, the scope, duration, and/or other attributes of the authorization grant. Once acquired, the third party can present a valid access token to the resource server, which permits access to the appropriate protected resources stored on the server. In some cases, the third party client can present its own credentials to an authorization server to obtain an access token without having to first obtain an authorization grant directly from the resource owner. Such tokens are issued to clients by the authorization server with the approval of the resource owner. In one embodiment, an OAuth access token can be encoded in an access token that complies with HTTP/1.1 (e.g., as defined in RFC2616) using Transport Layer Security (TLS) (e.g., as defined in RFC5246).

JSON Web Token (JWT) is a compact information representation format intended for space constrained environments such as HTTP Authorization headers and URI query parameters. JWTs encode information to be transmitted as a JavaScript Object Notation (JSON) object (e.g., as defined by RFC4627) that is used as the payload of a JSON Web Signature (JWS) structure or as the plaintext of a JSON Web Encryption (JWE) structure, enabling the information to be digitally signed and/or encrypted. A JWT can be represented as a sequence of URL-safe parts separated by period ('.') characters. Each part can contain a base64url encoded value. In one specific embodiment, a JWT can be encoded and signed in three parts. The first part includes a JWT header, the second part includes a JWT payload, including a client identification value associated with the client that is requesting access to a protected resource, and the third part includes an encoded JWT signature. For example:

```
http://www.example.com/preview.html?token=
<encoded JWT header>.<encoded JWT payload>.<encoded
JWT signature>
```

The JWT header defines the object type (e.g., that the object is a JWT) and the encoding algorithm used to encode the object. Encoding the octets of the UTF-8 representation of the JWT header using base64url yields the encoded JWS header. The JWT payload defines the information in the JWT. The client identification value can form at least a portion of the information. Encoding the octets of the UTF-8 representation of the JWT payload using base64url yields the encoded JWS payload. Signing the encoded JWS header and encoded JWS payload with a signing algorithm, such as a keyed-hash message authentication code (HMAC) SHA-256 algorithm, and encoding the signature using base64url yields the encoded JWS signature. As described above, the encoded JWS header, payload and signature are concatenated in order with period ('.') characters between each part to produce the access token. For example:

```
token=EXfjy0oBAAA.nMZuvRPteYhT39egdKNkpA.-
NAs_3cy2c9aeH_jAhm4Iw&postId=4979612100890612168
```

As used herein, the term "client," in addition to its plain and ordinary meaning, includes any computing device and/or software application that accesses a remote service or application provided by another computing device. A client may include, for example, a user computing system or application that accesses services and/or data provided by a remote system via a communications network, such as the Internet and/or a company intranet or other wired/wireless network. As used herein, the term "browser," in addition to its plain and ordinary meaning, includes a client-based application which can be used to access services and/or data provided by a remote system. As used herein, the term "server," in addition to its plain and ordinary meaning, includes any computing device that provides one or more services, such as applications and data, to one or more clients.

System Architecture

Figure 5:
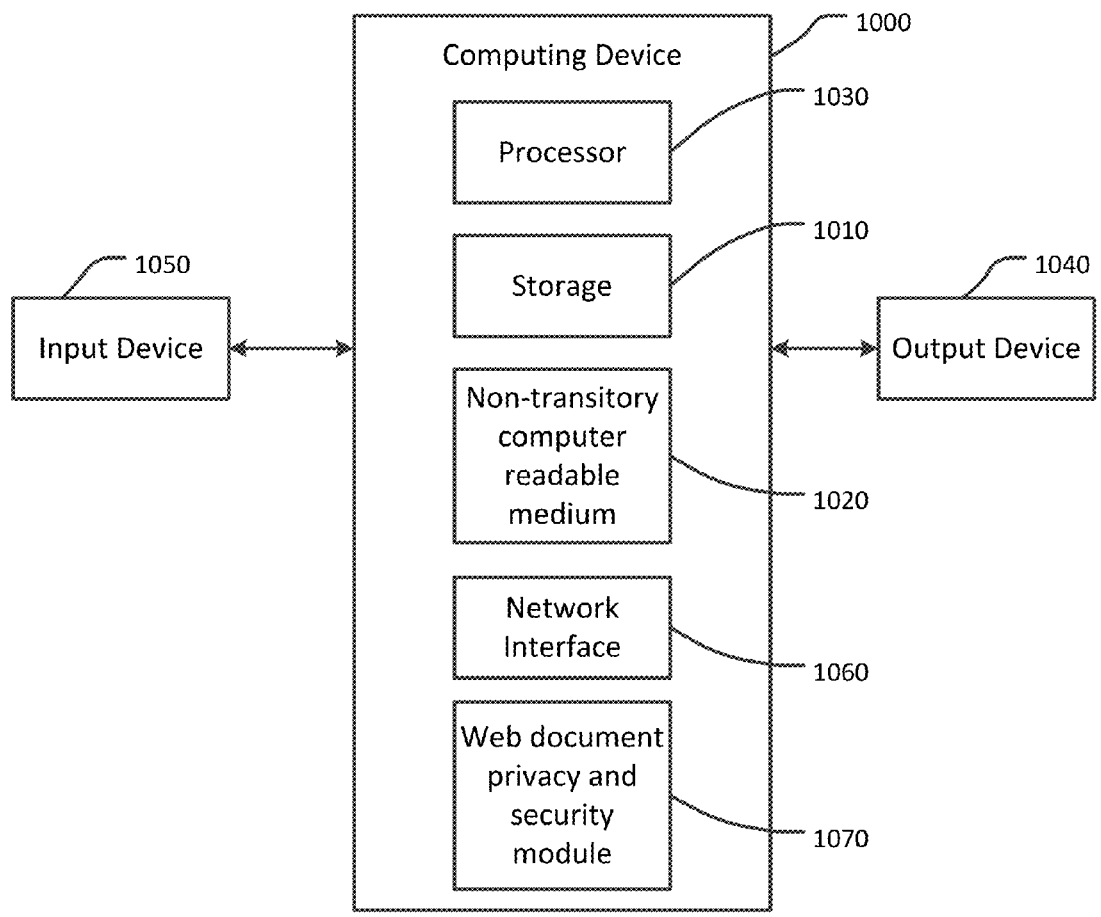
FIG. 5 is a block diagram representing an example computing device that may be used to perform any of the techniques as variously described in this disclosure.

FIG. 1 illustrates an example system 100 configured for protecting the privacy and security of data associated with a web document, in accordance with an embodiment. The system 100 includes a user computing device 110 and one or more remote computing devices 120 communicatively coupled to the user computing device 110 via a communications network 130. The user computing device 110 includes a web browser 112. Each remote computing device 120 includes a web server 122 configured to serve data to, and otherwise interact with, the browser 112. The web server 122 hosts a web page document 124, a content repository 126, or both. The browser 112 can access and interact with the web server 112, and access and change web resources in the content repository 126. The browser 112 interacts with one or more input devices, such as a keyboard and mouse, and one or more display devices (such as shown in FIG. 5).

The web page document 124 may include, for example, HTML markup language and links 128 to web page content stored in the content repository 126. The web page document 124 is referenced by a URL (URL 1) that uniquely identifies the web page document 124. There can be any number of web page documents, each referenced by different URLs (e.g., URL 2).

The content repository 126 is configured to store various web resources, such as web page content including images, style sheets, scripts, and other information that can be used to generate a web page on the browser 112.

The web server 122 may include, for example, a web content management system (WCMS), such as Adobe Experience Manager (AEM). The system 100 may include additional components and still fall within the scope of the disclosed embodiments. The browser 112 can be any of a number of browsers, including, for example, Microsoft Internet Explorer®, Mozilla Firefox®, Safari®, Google Chrome®, and Opera®. The user computing system 100 can be configured to execute any of a number of operating systems, such as Microsoft Windows®, Mac OS®, Google Android® and any one of the Linux®-based operating systems. The user computing system 100 can be implemented with any suitable computing device, such as a laptop, desktop, tablet computer, smartphone, or other suitable computing device capable of receiving input from a user and providing a GUI via the display. The content repository 126 can be implemented, for example, with any suitable type of memory, such as a disk drive included in, or otherwise in communication with, the browser 112 and/or the web server 122. Other suitable memories include flash memory, random access memory (RAM), a memory stick or thumb drive, USB drive, cloud storage service, etc. In a more general sense, any memory facility can be used to implement the data storage. The network 130 can be any communications network, such as a local area network or the Internet, or any other public and/or private communication network. Such a system 100 may be suitable, for example, for protecting the privacy and security of data associated with a web document (e.g., web page document 124) using techniques as variously described herein.

It will be appreciated that, in some embodiments, various functions and data transformations performed by the browser 112, the web server 122, and the content repository 126, as described herein, can performed by similar processors and/or storage devices in different configurations and arrangements, and that the depicted embodiments are not intended to be limiting. Various components of this example embodiment can be integrated into, for example, one or more desktop or laptop computers, workstations, tablets, smartphones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent. Various components of the system shown in FIG. 1, such as the browser and web application, can be implemented in software, such as a set of instructions (e.g. C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided herein to be carried out. In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described herein. In a more general sense, any suitable combination of hardware, software, and firmware can be used, as will be apparent.

Example Use Cases

Figure 2:
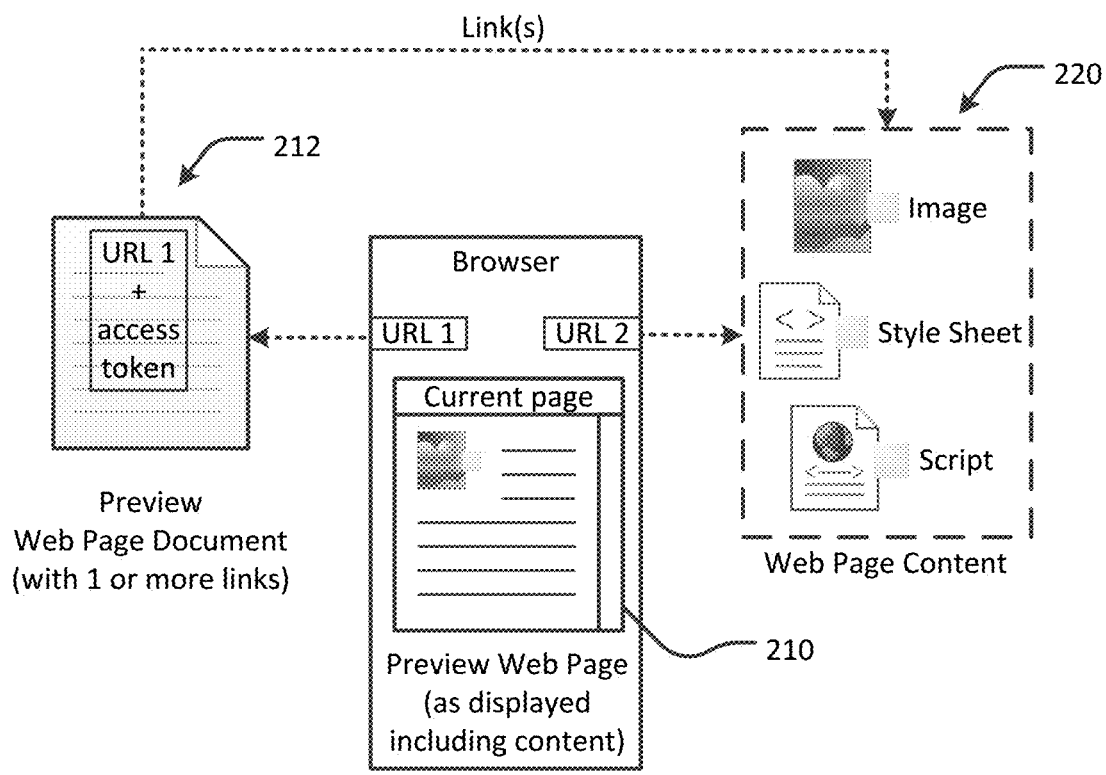
FIG. 2 illustrates an example use scenario for protecting the privacy and security of data associated with a web document using a web browser, in accordance with an embodiment of the present disclosure.

FIG. 2 illustrates an example use scenario for protecting the privacy and security of data associated with a web document using a web browser, such as the browser 112 of FIG. 1, in accordance with an embodiment. As can be seen in FIG. 2, the browser can include a browser window 210 for displaying a preview web page having several components, including, for example, a section of text or other web page content. It will be noted that the preview web page depicted in FIG. 2 is a DOM representation in which the formatted content of the web page is visible in the browser window 210, but the underlying markup language, scripts and/or style sheet instructions are not necessarily visible in the browser window 210. The web browser can generate the DOM representation in response to receiving and parsing a structured document (e.g., the web page document 124 of FIG. 1) generated by a web application (e.g., a CMS or the web server 122 of FIG. 1). As generally known, commercial web browsers use the Document Object Model (DOM) as an interface for representing and interacting with objects in HTML and XML documents. As used herein, the term "object," in addition to its plain and ordinary meaning, includes individual components of a web page, such as HTML elements (defined by start and end tags), that have been parsed into the DOM by the browser. With the DOM, developers can build web pages, navigate their structure, and add, modify, or delete elements and content. Each web page component has one or more properties. A property may include, for example, a path to a location of the component (e.g., a Universal Resource Locator or URL) and/or a type of the component (e.g., text, image, video file, audio file, or other piece of content).

In this example scenario, the browser loads a web page document 212 having a first URL (URL 1). As discussed above, the first URL can include an access token, which is used to gain access to the preview web page document. The web page document includes one or more links to web page content 220, such as images, style sheets, scripts, and other information that, while not directly encoded in the web page document, form parts of the web page as displayed in the browser window 210. However, after loading the web page document 212, but prior to loading the web page content 220, the browser changes the current page URL from the first URL (URL 1) to a second URL (URL 2) that does not include the access token. The current page URL is generally the URL that the browser displays in the address bar of the browser window 210 to indicate the URL of the displayed web page. The browser may also use the current page URL for other functions, including encoding the current page URL in the referrer field of an HTTP request message. The syntax of the referrer request header field for this scheme may, for example, follow the usage of the Basic scheme defined in Section 2 of RFC2617. For example:

```
GET /protected_resource HTTP/1.1
Host: server.example.com
Referer: http://www.example.com/home
```

However, according to an embodiment, the browser is configured to manipulate the current page URL under the same domain constraint. For example, the browser may change the current page URL from www.example.com/preview.html to www.example.com/blank.html or any other suitable URL within the same domain as the first URL (e.g., the URL of the preview web page). Generally, however, the second URL can refer to any web page document, including web page documents that the browser can access without any access token. It is noted that the web page document referred to by the second URL (URL 2) is not actually loaded into the browser. Instead, the web page content associated with the preview web page document (first URL) is loaded in a normal fashion, except that the current page URL of the browser is set to the second URL (URL 2) rather than the first URL (URL 1) during the web page content loading process. By changing the current page URL in this manner, any request messages subsequently generated by the browser for loading the web page content will include the second URL (if, for instance, a referrer field is included in the request message). However, such request messages will not include the first URL, and in particular, these request messages will not include the access token. This protects the access token from leaking to other destinations, where it could be intercepted and used by an unauthorized user. After all of the web page content associated with the preview web page document has completed loading, the browser can change the current page URL from the second URL back to the first URL, thus displaying the URL of the preview web page (e.g., the first URL) in the browser window 210.

Example Methodology

Figure 3:
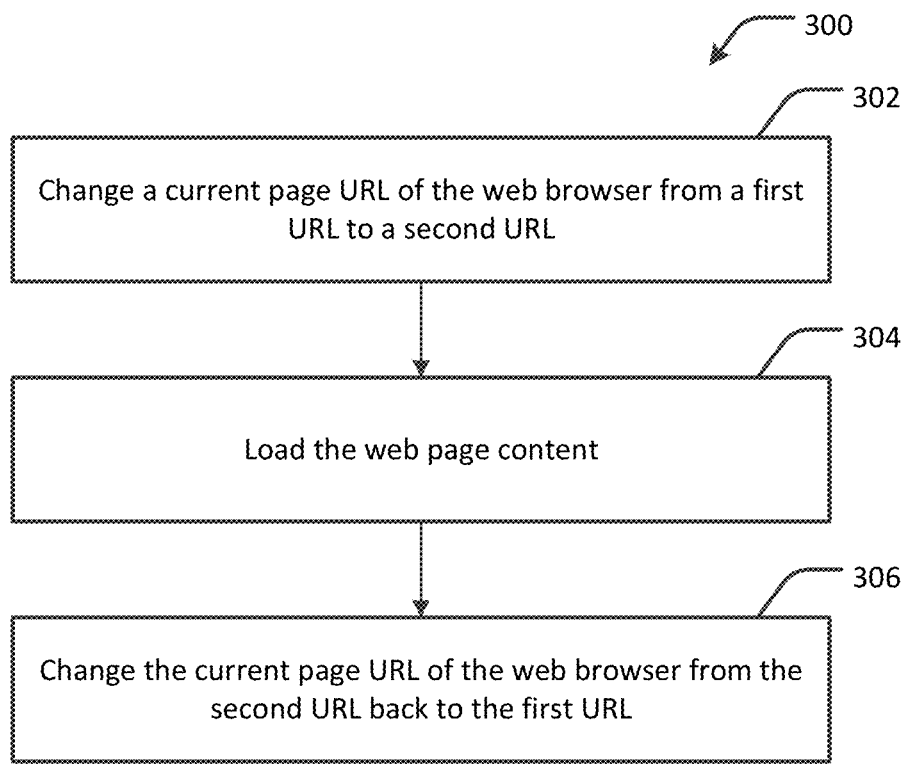
FIG. 3 illustrates an example methodology for protecting the privacy and security of data associated with a web document, in accordance with an embodiment of the present disclosure.

FIG. 3 illustrates an example methodology 300 for protecting the privacy and security of data associated with a web document, in accordance with an embodiment. The method 300 may be carried out, for example, by the example system 100 depicted in FIG. 1. JavaScript or other suitable code can be used to implement the method. Such code for performing the method 300 may be stored, for example, in the web document privacy and security module 1070 depicted in FIG. 5. In one such embodiment, the methodology can be used in conjunction with a web page document and web page content stored in a content repository, such as depicted in the example of FIG. 1. Such a web page may, for example, include HTML or XML code, JavaScript, CSS instructions, and/or other resources such as data, text, images, and multimedia which, when parsed by a web browser, can be used to form a web page with DOM components.

The method 300 begins by changing 302 a current page URL of a web browser from a first URL to a second URL. As discussed above, the current page URL generally is the URL of the web page document currently displayed by the browser, and the current page URL can be displayed in the address bar of the browser. For example, the browser may load a web page document, including HTML markup and JavaScript scripts, using a URL that includes an access token. The web page document may further include one or more links to web page content that is not directly encoded in the web page document (e.g., images, style sheets or scripts). Such web page content can reside on a different web server than the web server that provided the web page document, or the same server, or any number of different servers.

Once the web page document has been loaded, the browser is capable of manipulating the current page URL independently of the displayed web page. For example, the current page URL may be changed to a URL that is different than the URL of the displayed web page (e.g., the first URL) without otherwise affecting the appearance and functionality of the web page. In some cases, the first URL includes an access token. The access token data is used by the web browser to load the web page document, and likewise the web page document is inaccessible to the web browser without the access token data. Thus, by changing the current page URL in the browser to a different URL that does not include the access token (or any other non-protected information) the current page URL will not include the access token (or any protected information) even though the web page that is referenced by the URL with the access token is displayed in the browser. Additionally, by changing the current page URL to a different, second URL, any functions of the browser that use the current page URL, such as generating HTTP request messages, will not use the first URL with the access token, but rather will use the second URL instead.

The method 300 continues by loading 304 web page content referenced by the one or more links in the web page document. This can be performed after the current page URL has been changed at 302, as described above. The web page content can be loaded by the browser using one or more request messages. For example, the loading 304 may include loading, by the web browser, the web page content referenced by the one or more links in the web page document using a request message having, encoded in a referrer field, a second URL that does not include the access token data. As such, these request messages, including the referrer field(s), do not include the access token because the current page URL has been changed to a sacrificial URL. In some such cases, the access token data is not encoded in any portion of the request message.

The method 300 continues by changing 306 the current page URL of the web browser back to the first URL of the displayed web page. This can be performed after all of the web page content has been loaded at 304, as described above.

In some cases, the method 300 includes storing, by the web browser, the first URL in an internal browser variable, where the changing 306 of the current page URL of the web browser from the second URL back to the first URL includes retrieving the first URL from the internal browser variable. For instance, in an embodiment, the method 300 can be implemented using the following example script, which can be added to the web document at very beginning after the <head> tag of the HTML markup:

```
<script>
(function ( ) {
    var currentPath = window.location.pathname,
    currentTitle = document.title;
// show alternate URL
    history.replaceState({ }, 'Referrer Protected', 'save-referrer.html');
// wait until external resources are loaded
// and then restore old path
    document.addEventListener('load', function ( ) {
    history.replaceState({ }, currentTitle, currentPath);
    });
}( ));
</script>
```

In some cases, a remote computing device serves the web page content referenced by the one or more links in the web page document to the web browser. In such cases, the method 300 includes preventing, by the web browser, the remote computing device from accessing either the first URL or the access token data. This may be accomplished, for example, by blocking, encrypting, or otherwise hiding the first URL and/or the access token data internally to the web browser using one or more of the techniques disclosed herein.

Figure 4:
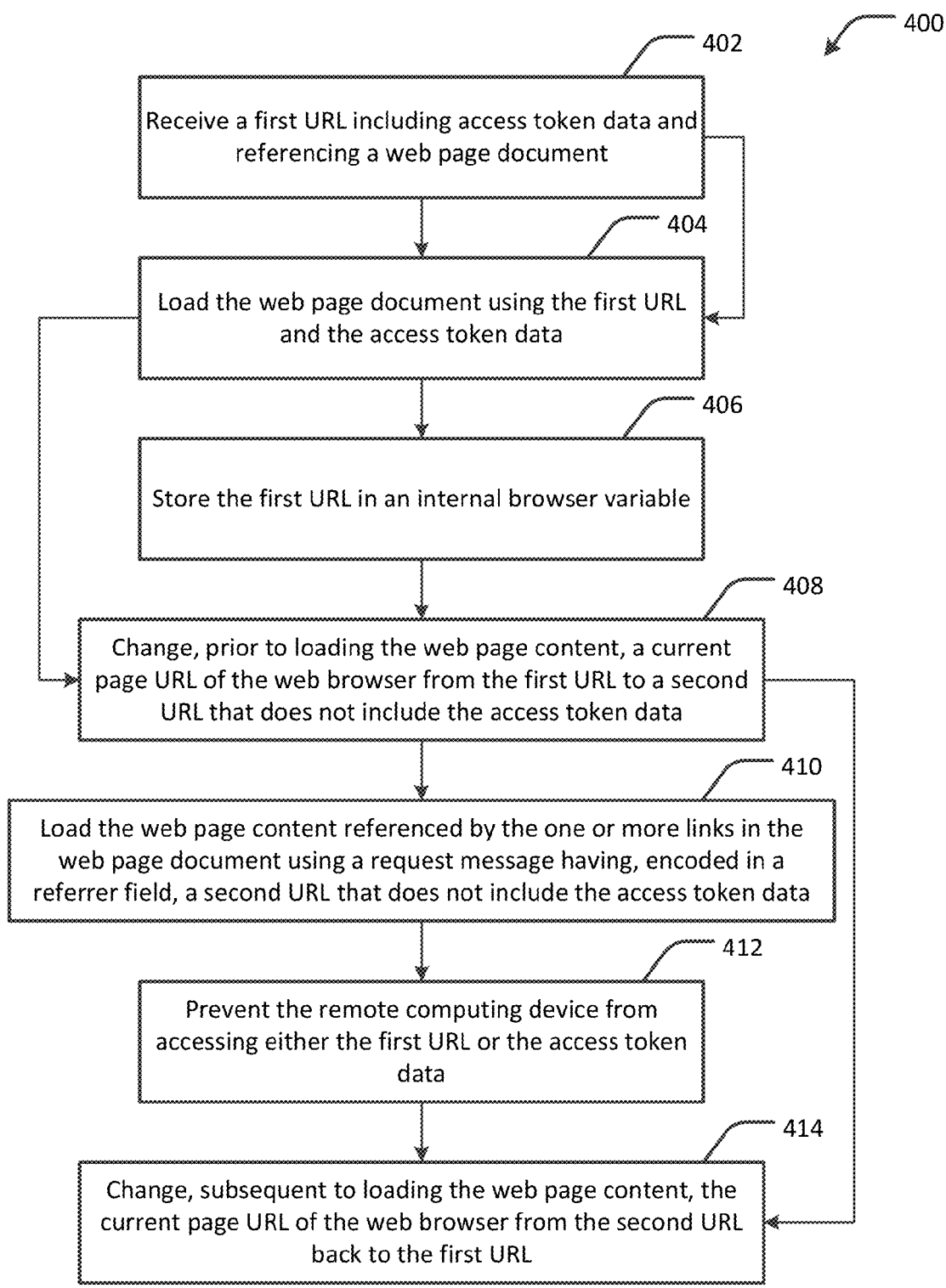
FIG. 4 illustrates another example methodology for protecting the privacy and security of data associated with a web document, in accordance with an embodiment of the present disclosure.

FIG. 4 illustrates another example methodology 400 for protecting the privacy and security of data associated with a web document, in accordance with an embodiment. The method 400 may be carried out, for example, by the example system 100 depicted in FIG. 1. Such code for performing the method 400 may be stored, for example, in the web document privacy and security module 1070 depicted in FIG. 5. JavaScript or other suitable code can be used to implement the method. In one such embodiment, the methodology can be used in conjunction with a web page document and web page content stored in a content repository, such as depicted in the example of FIG. 1. Such a web page may, for example, include HTML or XML code, JavaScript, CSS instructions, and/or other resources such as data, text, images, and multimedia which, when parsed by a web browser, can be used to form a web page with DOM components.

The method 400 begins by receiving 402, by a web browser executing on a computing device, a first URL including access token data and referencing a web page document. The web page document includes one or more links to web page content. The method 400 further includes loading 404, by the web browser, the web page document using the first URL and the access token data. For example, the browser may load a web page document, including HTML markup and JavaScript scripts, using the first URL that includes an access token. The web page document may further include one or more links to web page content that is not directly encoded in the web page document (e.g., images, style sheets or scripts). Such web page content can reside on a different web server than the web server that provided the web page document, or the same server, or any number of different servers. In some cases, the access token data is used by the web browser to load the web page document, where the web page document is inaccessible to the web browser without the access token data.

In some cases, the method 400 includes storing 406, by the web browser, the first URL in an internal browser variable.

The method 400 further includes changing 408, by the web browser and prior to loading the web page content referenced by the one or more links in the web page document, a current page URL of the web browser from the first URL to the second URL that does not include the access token data. As discussed above, the current page URL generally is the URL of the web page document currently displayed by the browser, and the current page URL can be displayed in the address bar of the browser. Once the web page document has been loaded, the browser is capable of manipulating the current page URL independently of the displayed web page. For example, the current page URL may be changed to a URL that is different than the URL of the displayed web page without otherwise affecting the appearance and functionality of the web page. In some cases, the URL of the currently displayed web page includes an access token. Thus, by changing the current page URL in the browser to a different URL that does not include the access token, the current page URL will not include the access token even though the web page displayed in the browser is referenced by the first URL with the access token. Additionally, by changing the current page URL to a different URL, any functions of the browser that use the current page URL, such as generating HTTP request messages, will not use the URL with the access token.

The method 400 further includes loading 410, by the web browser, the web page content referenced by the one or more links in the web page document using a request message having, encoded in a referrer field, a second URL that does not include the access token data. This can be performed after the current page URL has been changed at 408, above. The web page content can be loaded by the browser using one or more request messages. These request messages, including the referrer field(s), do not include the access token. In some cases, the access token data is not encoded in any portion of the request message. In some cases, a remote computing device serving the web page content referenced by the one or more links in the web page document to the web browser does not have access to either the first URL or the access token data. In some cases, the method 400 includes preventing 412, by the web browser, the remote computing device from accessing either the first URL or the access token data. This may be accomplished, for example, by blocking, encrypting, or otherwise hiding the first URL and/or the access token data internally to the web browser.

In some cases, the method 400 includes changing 414, by the web browser and subsequent to loading the web page content referenced by the one or more links in the web page document, the current page URL of the web browser from the second URL back to the first URL. This can be performed after all of the web page content has been loaded at 410, as discussed above. In some cases, the changing 414 of the current page URL of the web browser from the second URL back to the first URL includes retrieving the first URL from the internal browser variable.

In some embodiments, the method 300, 400, or both, includes activating a web page editor associated with a REST-based CMS, which may, for example, be provided by the web server. As is known, REST refers to representational state transfer ("REST") and is a software architecture for distributed systems, such as the World Wide Web. In a REST architecture, servers hold resources such as web page content, documents, images and other types of information that are addressable by a client. A client wishing to create or modify a resource sends data representing the resource to the server, which stores the data in a repository such as a database. The web page editor can include any application configured to permit a user to author or edit the web page. For example, the web page editor may include one or more tools, controls and/or interfaces that facilitate editing of the web page. The web page editor may further include tools, controls and/or interfaces that enable a user to provide a URL referencing the web page to another user for preview. As discussed above, such a URL can include an access token. The method further includes generating a structured document (e.g., a web page document) configured to present, when rendered by the web browser, the components of the web page. The structured document, and in particular the preview web page document, can include code executable by a web browser that performs some or all of the methodologies disclosed herein, including the method 300 of FIG. 3 or the method 400 of FIG. 4. One example of such code is the JavaScript script described above. This code can be encoded at or near the beginning of the structured document so that it is among the first parts of the structured document processed by the web browser when the document is loaded. The method further includes sending or serving the structured document to a web browser for processing and rendering. The any or all portions of the method 300 or 400 can repeat indefinitely or until the web browser or web page editor is deactivated.

Example Computing Device

FIG. 5 is a block diagram representing an example computing device 1000 that may be used to perform any of the techniques as variously described in this disclosure. For example, the system 100 of FIG. 1, or any portions thereof, and the methodologies of FIGS. 3 and 4, or any portions thereof, may be implemented in the computing device 1000. The computing device 1000 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described in this disclosure. A distributed computational system may be provided comprising a plurality of such computing devices.

The computing device 1000 includes one or more storage devices 1010 and/or non-transitory computer-readable media 1020 having encoded thereon one or more computer-executable instructions or software for implementing techniques as variously described in this disclosure. The storage devices 1010 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement various embodiments as taught in this disclosure. The storage device 1010 may include other types of memory as well, or combinations thereof. The storage device 1010 may be provided on the computing device 1000 or provided separately or remotely from the computing device 1000. The non-transitory computer-readable media 1020 may include, but are not limited to, one or more types of hardware memory, non-transitory tangible media (for example, one or more magnetic storage disks, one or more optical disks, one or more USB flash drives), and the like. The non-transitory computer-readable media 1020 included in the computing device 1000 may store computer-readable and computer-executable instructions or software for implementing various embodiments. The computer-readable media 1020 may be provided on the computing device 1000 or provided separately or remotely from the computing device 1000.

The computing device 1000 also includes at least one processor 1030 for executing computer-readable and computer-executable instructions or software stored in the storage device 1010 and/or non-transitory computer-readable media 1020 and other programs for controlling system hardware. Virtualization may be employed in the computing device 1000 so that infrastructure and resources in the computing device 1000 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 1000 through an output device 1040, such as a screen or monitor, which may display one or more user interfaces provided in accordance with some embodiments. The output device 1040 may also display other aspects, elements and/or information or data associated with some embodiments. The computing device 1000 may include other I/O devices 1050 for receiving input from a user, for example, a keyboard, a joystick, a game controller, a pointing device (e.g., a mouse, a user's finger interfacing directly with a display device, etc.), or any suitable user interface. The computing device 1000 may include other suitable conventional I/O peripherals, such as a camera 1052. The computing device 1000 can include and/or be operatively coupled to various suitable devices for performing one or more of the aspects as variously described in this disclosure.

The computing device 1000 may run any operating system, such as any of the versions of Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device 1000 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

As will be appreciated in light of this disclosure, the various modules and components of the system, such as the browser 112, the web server 122, the content repository 126, or any combination of these, can be implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions and data transformations performed by the user computing system, as described in this disclosure, can be performed by similar processors and/or databases in different configurations and arrangements, and that the depicted embodiments are not intended to be limiting. Various components of this example embodiment, including the computing device 1000, can be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent. For example, the computing device 1000 may include a web document privacy and security module 1070 configured to store code for performing the method 300, 400 or both, such as described with respect to FIGS. 3 and 4.

Numerous embodiments will be apparent in light of the present disclosure, and features described herein can be combined in any number of configurations. One example embodiment provides a computer-implemented method. The method includes loading, by a web browser executing on a computing device, a web page document referenced by a first Uniform Resource Locator (URL), the first URL including access token data, the web page document including one or more links to web page content; changing, by the web browser and prior to loading the web page content referenced by the one or more links in the web page document, a current page URL of the web browser from the first URL to a second URL that does not include the access token data, such that the first URL is not presented for display via the web browser; and changing, by the web browser and subsequent to loading the web page content referenced by the one or more links in the web page document, the current page URL of the web browser from the second URL back to the first URL. By changing the current page URL in this manner, any request messages subsequently generated by the browser for loading the web page content will include the second URL (if, for instance, a referrer field is included in the request message). However, such request messages will not include the first URL, and in particular, these request messages will not include the access token. This protects the access token from leaking to other destinations, where it could be intercepted and used by an unauthorized user. After all of the web page content associated with the preview web page document has completed loading, the browser can change the current page URL from the second URL back to the first URL, thus displaying the URL of the preview web page (e.g., the first URL) in the browser window. In some cases, the method includes loading, by the web browser, the web page content referenced by the one or more links in the web page document using a request message having, encoded in a referrer field, the second URL that does not include the access token data. In some such cases, the access token data is not encoded in any portion of the request message. In some cases, a remote computing device serves the web page content referenced by the one or more links in the web page document to the web browser, and the method includes preventing, by the web browser, the remote computing device from accessing either the first URL or the access token data. In some cases, the method includes storing, by the web browser, the first URL in an internal browser variable, where the changing of the current page URL of the web browser from the second URL back to the first URL includes retrieving the first URL from the internal browser variable. In some cases, the access token data is used by the web browser to load the web page document, and the web page document is inaccessible to the web browser without the access token data. In some cases, the second URL references data representing only non-protected information. In some cases, some or all of the aspects variously described in this paragraph can be performed in any order and at any time by one or more different user computing systems.

Another example embodiment provides a computer-implemented method. The method includes receiving, by a web browser executing on a computing device, a first Uniform Resource Locator (URL) including access token data and referencing a web page document, the web page document including one or more links to web page content; loading, by the web browser, the web page document using the first URL and the access token data; and loading, by the web browser, the web page content referenced by the one or more links in the web page document using a request message having, encoded in a referrer field, a second URL that does not include the access token data. In some cases, the access token data is not encoded in any portion of the request message. In some cases, the method includes changing, by the web browser and prior to loading the web page content referenced by the one or more links in the web page document, a current page URL of the web browser from the first URL to the second URL that does not include the access token data, such that the first URL is not presented for display via the web browser. In some such cases, the method includes changing, by the web browser and subsequent to loading the web page content referenced by the one or more links in the web page document, the current page URL of the web browser from the second URL back to the first URL. In some such cases, the method includes storing, by the web browser, the first URL in an internal browser variable, wherein the changing of the current page URL of the web browser from the second URL back to the first URL includes retrieving the first URL from the internal browser variable. In some cases, a remote computing device serving the web page content referenced by the one or more links in the web page document to the web browser does not have access to either the first URL or the access token data. In some cases, the access token data is used by the web browser to load the web page document, and the web page document is inaccessible to the web browser without the access token data. In some cases, the second URL references data representing only non-protected information. In some cases, some or all of the aspects variously described in this paragraph can be performed in any order and at any time by one or more different user computing systems.

Another example embodiment provides a system having a storage and a processor operatively coupled to the storage. The storage includes instructions that when executed by the processor cause the processor to carry out a process including loading a web page document referenced by a first Uniform Resource Locator (URL), the first URL including access token data, the web page document including one or more links to web page content; changing, prior to loading the web page content referenced by the one or more links in the web page document, a current page URL of the web browser from the first URL to a second URL that does not include the access token data, such that the first URL is not presented for display via the web browser; and changing, subsequent to loading the web page content referenced by the one or more links in the web page document, the current page URL of the web browser from the second URL back to the first URL. By changing the current page URL in this manner, any request messages subsequently generated for loading the web page content will include the second URL (if, for instance, a referrer field is included in the request message). However, such request messages will not include the first URL, and in particular, these request messages will not include the access token. This protects the access token from leaking to other destinations, where it could be intercepted and used by an unauthorized user. After all of the web page content associated with the preview web page document has completed loading, the processor can change the current page URL from the second URL back to the first URL, thus displaying the URL of the preview web page (e.g., the first URL) in, for example, a browser window. In some cases, the process includes loading the web page content referenced by the one or more links in the web page document using a request message having, encoded in a referrer field, the second URL that does not include the access token data. In some such cases, the access token data is not encoded in any portion of the request message. In some cases, a remote computing device serves the web page content referenced by the one or more links in the web page document to the processor, and the method includes preventing the remote computing device from accessing either the first URL or the access token data. In some cases, the method includes storing the first URL in an internal variable (e.g., in the storage), where the changing of the current page URL from the second URL back to the first URL includes retrieving the first URL from the internal variable. In some cases, the access token data is used to load the web page document, and the web page document is inaccessible to the processor without the access token data. In some cases, the second URL references data representing only non-protected information. In some cases, some or all aspects variously described in this paragraph can be performed in any order and at any time by the processor. Another example embodiment provides a non-transient computer program product having instructions encoded thereon that when executed by one or more processors cause a process to be carried out for performing one or more of the aspects variously described in this paragraph.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method comprising:
loading, by a web browser executing on a computing device, a web page document referenced by a first Uniform Resource Locator (URL), the first URL including access token data, the web page document including one or more links to web page content;
removing, by the web browser and prior to loading the web page content referenced by the one or more links in the web page document, the access token data from a current page URL of the web browser by replacing the current page URL with a second URL that is different than the first URL and does not include the access token data, such that the first URL is not presented for display via the web browser prior to loading the web page content referenced by the one or more links in the web page document;
restoring, by the web browser and subsequent to loading the web page content referenced by the one or more links in the web page document, the access token data to the current page URL of the web browser by replacing the current page URL with the first URL; and
displaying the first URL including the access token data via the web browser subsequent to loading the web page content referenced by the one or more links in the web page document,
wherein a remote computing device serves the web page content referenced by the one or more links in the web page document to the web browser, and wherein the method further comprises preventing, by the web browser, the remote computing device from accessing either the first URL or the access token data.

2. The method of claim 1, further comprising loading, by the web browser, the web page content referenced by the one or more links in the web page document using a request message having, encoded in a referrer field, the second URL that does not include the access token data.

3. The method of claim 2, wherein the access token data is not encoded in any portion of the request message.

4. The method of claim 1, further comprising storing, by the web browser, the first URL in an internal browser variable, wherein the replacing of the current page URL of the web browser with the first URL includes retrieving the first URL from the internal browser variable.

5. The method of claim 1, wherein the access token data is used by the web browser to load the web page document, the web page document being inaccessible to the web browser without the access token data.

6. The method of claim 1, wherein the second URL references data representing only non-protected information.

7. A computer-implemented method comprising:
receiving, by a web browser executing on a computing device, a first Uniform Resource Locator (URL) including access token data and referencing a web page document, the web page document including one or more links to web page content;
loading, by the web browser, the web page document using the first URL and the access token data;
removing, by the web browser and prior to loading the web page content referenced by the one or more links in the web page document, the access token data from a current page URL of the web browser by replacing the current page URL with a second URL that is different than the first URL and does not include the access token data;
loading, by the web browser, the web page content referenced by the one or more links in the web page document using a request message having, encoded in a referrer field, the second URL that does not include the access token data; and
restoring, by the web browser and subsequent to loading the web page content referenced by the one or more links in the web page document, the access token data to the current page URL of the web browser by replacing the current page URL with the first URL,
wherein a remote computing device serving the web page content referenced by the one or more links in the web page document to the web browser does not have access to either the first URL or the access token data.

8. The method of claim 7, wherein the access token data is not encoded in any portion of the request message.

9. The method of claim 7, wherein the first URL is not presented for display via the web browser.

10. The method of claim 7, further comprising storing, by the web browser, the first URL in an internal browser variable, wherein the replacing of the current page URL of the web browser with the first URL includes retrieving the first URL from the internal browser variable.

11. The method of claim 7, wherein the access token data is used by the web browser to load the web page document, the web page document being inaccessible to the web browser without the access token data.

12. The method of claim 7, wherein the second URL references data representing only non-protected information.

13. A non-transitory computer program product having instructions encoded thereon that when executed by one or more computer processors cause the one or more computer processors to perform a process comprising:
loading a web page document referenced by a first Uniform Resource Locator (URL), the first URL including access token data, the web page document including one or more links to web page content;
removing, prior to loading the web page content referenced by the one or more links in the web page document, the access token data from a current page URL of a web browser by replacing the current page URL with a second URL that is different than the first URL and does not include the access token data;
restoring, subsequent to loading the web page content referenced by the one or more links in the web page document, the access token data to the current page URL of the web browser by replacing the current page URL with the first URL; and
displaying the first URL including the access token data via the web browser subsequent to loading the web page content referenced by the one or more links in the web page document,
wherein a remote computing device serves the web page content referenced by the one or more links in the web page document to the web browser, and wherein the process further comprises preventing the remote computing device from accessing either the first URL or the access token data.

14. The computer program product of claim 13, wherein the process further comprises loading the web page content referenced by the one or more links in the web page document using a request message having, encoded in a referrer field, the second URL that does not include the access token data.

15. The computer program product of claim 14, wherein the access token data is not encoded in any portion of the request message.

16. The computer program product of claim 13, wherein the process further comprises storing the first URL in an internal browser variable, wherein the replacing of the current page URL of the web browser with the first URL includes retrieving the first URL from the internal browser variable.

* * * * *